United States Patent [19]
Oono et al.

[11] Patent Number: 6,055,378
[45] Date of Patent: Apr. 25, 2000

[54] MOTOR-DRIVEN AUTO-FOCUSING SYSTEM

[75] Inventors: Masahiro Oono, Saitama-ken; Hisao Iwanade, Tokyo; Noboru Saitoh, Saitama-ken; Koji Sato, Saitama-ken; Sukenori Shiba, Saitama-ken; Tatsuya Yoshida, Saitama-ken; Nobuyuki Nagai, Saitama-ken, all of Japan

[73] Assignee: Asahi Kogaku Kogyo Kabushiki Kaisha, Tokyo, Japan

[21] Appl. No.: 09/021,860

[22] Filed: Feb. 11, 1998

[30] Foreign Application Priority Data

Feb. 12, 1997 [JP] Japan .................................. 9-027952

[51] Int. Cl.[7] .................................................. G03B 13/36
[52] U.S. Cl. ............................................. 396/82; 396/133
[58] Field of Search ............................ 396/79–83, 133, 396/135, 136; 348/347, 345, 357

[56] References Cited

U.S. PATENT DOCUMENTS

| | | |
|---|---|---|
| 5,117,137 | 5/1992 | Kobayashi . |
| 5,126,896 | 6/1992 | Yamagata ............... 360/78.04 |
| 5,298,933 | 3/1994 | Chigira ....................... 396/82 |
| 5,594,311 | 1/1997 | Yasuda et al. ............ 318/685 |

*Primary Examiner*—W. B. Perkey
*Attorney, Agent, or Firm*—Greenblum & Bernstein

[57] ABSTRACT

An auto-focusing device of a camera includes a photographic lens having a focusing lens group guided along an optical axis, a stepping motor for moving the focusing lens group along the optical axis to bring an object into focus; and a controller for controlling the stepping motor to rotate stepwise when the depth of focus is smaller than a predetermined value and for controlling the stepping motor to rotate the rotor by even-numbered steps when the depth of focus of the photographic lens is greater than the predetermined value.

14 Claims, 10 Drawing Sheets

MOTOR-DRIVEN AUTO-FOCUSING SYSTEM

BACKGROUND OF THE INVENTION

1. Field of the Invention

The present invention relates to an auto-focusing system, and more specifically relates to an auto-focusing system of a camera which is provided with a stepping (stepper) motor for shifting a focusing lens group along an optical axis thereof to bring an object into focus.

2. Description of the Related Art

An auto-focusing system provided in a camera is generally provided with a motor for shifting a focusing lens group of a photographic lens along an optical axis thereof to bring an object into focus. In the case that the motor is an DC motor, the auto-focusing system is often provided with an encoder that detects a position of the focusing lens group relative to a reference position. In the case where such an encoder is used, a space for positioning the encoder must be secured in the camera, which causes to enlarge the camera body. Furthermore, a device that detects outputs issued by the encoder needs to be provided in the camera.

For the purpose of reducing a space necessary for positioning the auto-focusing system in the camera, a stepping motor can be used for moving the focusing lens group. In a 1–2 phase excitation system (1–2 phase-on drive system) stepping motor, when the power supply is terminated at a 1-phase excitation position, i.e., if no excitation occurs, the rotor stops at a 1-phase excitation position (detent position, detent point). On the other hand, when the power supply is terminated at a 2-phase excitation position, the rotor is in a position between the detent positions (equilibrium position, stable position, stable point) and hence, the rotor tends to rotate to one of the detent positions. Therefore, if power to the motor in motion is terminated at the moment the rotor is positioned at any equilibrium position, it is often the case that the rotor rotates due to, for example, the force of inertia, in a forward or reverse direction to thereby stop at either one of the two adjacent detent positions, which may cause a positional error of the rotor. For this reason when the motor in motion is controlled so as to stop the rotor at a equilibrium position between two adjacent detent positions, the corresponding two adjacent phases must be maintained to be excited so that the rotor remains at the equilibrium position, which increases the power consumption.

SUMMARY OF THE INVENTION

It is an object of the present invention to provide an auto-focusing system of a camera which is provided with a stepping motor for moving a focusing lens group along an optical axis thereof to bring an object into focus and which consumes less power, which increases the service life of a battery used for the camera.

To achieve the object mentioned above, according to the present invention, there is provided an auto-focusing device of a camera having a photographic lens (which is preferably a zoom lens) with a focusing lens group guided along an optical axis; a stepping motor for moving the focusing lens group along the optical axis to bring an object into focus; and a controller for controlling the stepping motor to rotate stepwise when depth of focus is smaller than a predetermined depth of focus and for controlling the stepping motor to rotate the rotor by even-numbered steps when the depth of focus of the photographic lens is greater than the predetermined value.

The stepping motor is a variable-phase excitation type of stepping motor. Namely, a stepping motor having a rotor that can stop at a detent position which is termed as a 1-phase excitation position, and can also stop in between two detents which is termed as a 2-phase excitation position.

The controller controls the stepping motor to stop at any one of a plurality of detent positions of the rotor when the depth of focus is smaller than the predetermined value.

Furthermore, there is also provided a photometering device for measuring the brightness of an object; an aperture-value-determining device for determining an aperture value in accordance with the brightness measured by the photometering device; an object distance measuring device for measuring an object distance of an object; and a focal-length detecting device for detecting the focal-length of the zoom lens, wherein the controller includes a means for judging whether the depth of focus is greater or smaller than the predetermined value in accordance with the aperture value determined by the aperture-value-determining device and the focal-length detected by the focal-length detecting device.

Preferably, a memory for storing a data table containing data of threshold aperture values for respective combinations of focal-lengths of the zoom lens with object distances is provided. Each of the threshold aperture values are determined so that the depth of focus is always greater than the predetermined value, wherein the judging means first selects one of the threshold aperture values in accordance with the aperture value determined by the aperture-value-determining device and the focal-length detected by the focal-length detecting device and subsequently compares one of the selected threshold aperture values with the aperture value determined by the aperture value to determine whether the depth of focus is greater or smaller than the predetermined value.

Preferably, the controller can determine whether the number of drive pulses for driving the stepping motor is an integer, so as to rotate stepwise from an initial position in accordance with the aperture value determined by the aperture-value-determining device and the focal-length detected by the focal-length detecting device. Preferably, the controller can determine whether the number of drive pulses for driving the stepping motor is an even number, so as to rotate by even-numbered steps from the initial position in accordance with the aperture value determined by the aperture-value-determining device and the focal-length detected by the focal-length detecting device.

Preferably, in the case where the stepping motor stops at an equilibrium position between any two adjacent detent positions when the controller controls the stepping motor in motion to stop when the depth of focus of the photographic lens is greater than the predetermined value, the controller controls the stepping motor to stop at either one of the two adjacent detent positions.

Preferably, the controller controls the stepping motor to stop the rotor at one of the two adjacent detent positions which renders the photographic lens to have a state of front focus relative to the object.

Preferably, the controller controls the stepping motor to stop at one of the two adjacent detent positions which is closer to the front of the rotational direction of the rotor.

Preferably, the photographic lens also includes another lens group guided along the optical axis to be movable relative to the focusing lens group, wherein the auto-focusing device also has another stepping motor for moving the other lens group along the optical axis, and the stepping motors are controlled by the controller to move the focusing lens groups along the optical axis in opposite directions.

The present disclosure relates to object matter contained in Japanese patent application No. 09-27952 (filed on Feb. 12, 1997) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENT

The illustrated embodiment is applied to a digital still camera. This digital still camera is generally made up of two portions: a zoom lens portion and a camera body portion. The zoom lens portion is provided with a power zoom lens (motor-driven zoom lens) and an image pickup device (CCD), while the camera body portion is provided with an image data storing device such as a flash memory and an image indicating device such as a color LCD panel.

Figure 1:
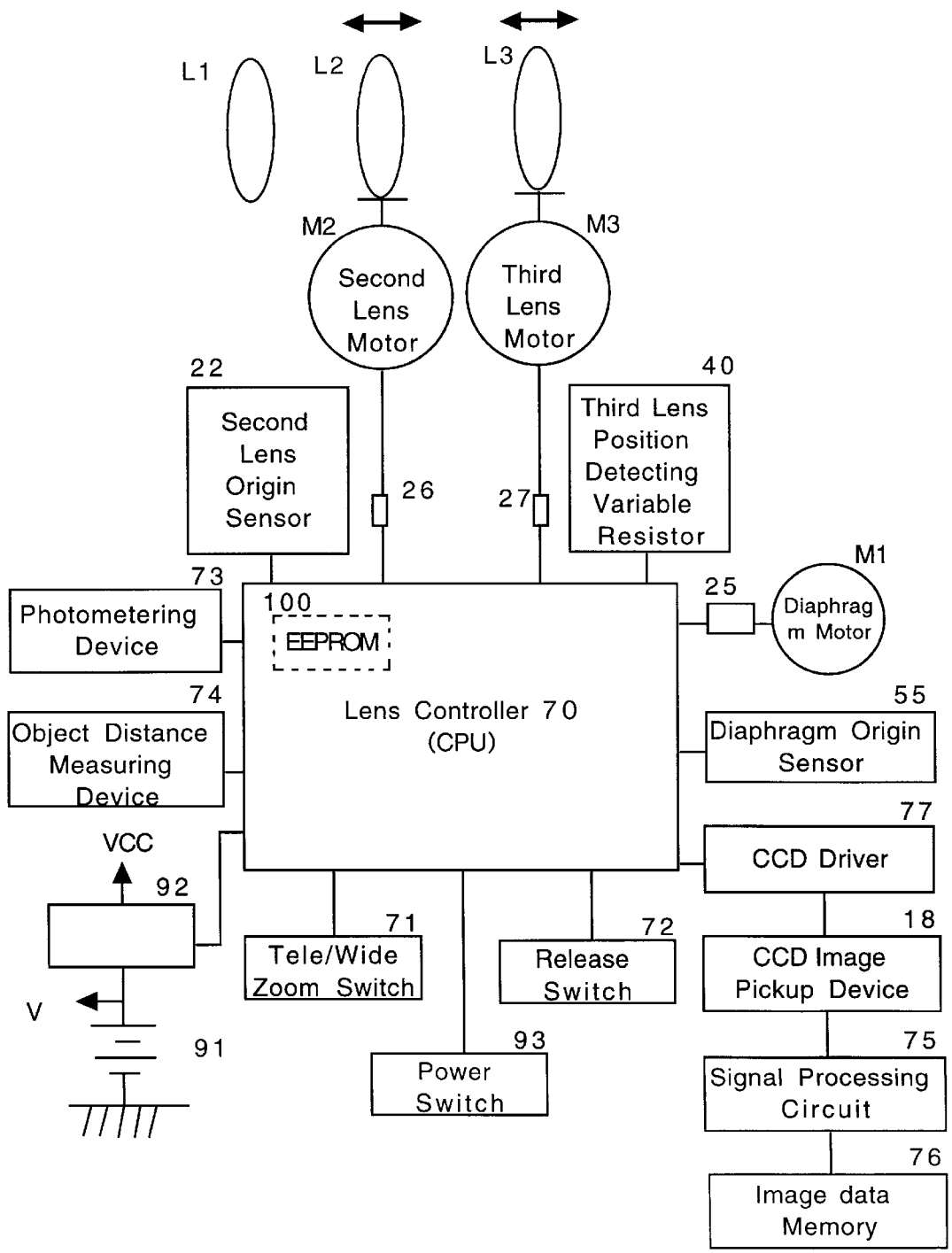
FIG. 1 is a block diagram of a control system for a zoom lens portion of an embodiment of a digital still camera to which the present invention is applied.

The control system of the zoom lens portion will be hereinafter discussed with reference to FIG. 1. The zoom lens portion is provided with a photographic lens system consisting of three lens groups, i.e., a first, second and third lens group L1, L2 and L3 (see FIG. 5). The first lens group L1 is a stationary lens group while each of the second and third lens groups L2 and L3 is a movable lens group which is guided along an optical axis O (see FIG. 5) of the lens groups. The zoom lens portion is further provided with a lens controller (CPU) 70 which comprehensively controls the zoom lens portion. A first stepping motor M1 for driving an aperture stop 53 (see FIG. 5), a second stepping motor M2 for driving the second lens group L2; a third stepping motor M3 for driving the third lens group L3 are connected to the lens controller 70 via first, second and third motor drivers 25, 26 and 27, respectively. In the present embodiment, each of the first, second and third stepping motors M1, M2 and M3 is a variable-phase excitation type stepping motor.

The principle behind the configuration and the driving of the variable-phase excitation type stepping motor which is employed in the present invention will be explained below with reference to FIGS. 9A, 9B, 9C and 10.

The drive circuit for this type of stepping motor receives electric pulses, causing the rotor to rotate in the clockwise direction in the following order: terminals (A0~A1) and (B0~B1) (2-phase (twin-phase-group) excitation), terminals (B0~B1) (1-phase (single-phase-group) excitation), terminals (B0~B1) and (A1~A0) (2-phase excitation), terminals (A1~A0) (1-phase excitation), terminals (A1~A0) and (B1~B0) (2-phase excitation), and terminals (A0~A1) (1-phase excitation).

When the power is cut off at the 1-phase excitation position, (e.g., as in FIGS. 9A or 9C) since the north and south poles of the rotor 111 are attracted to the poles 103A and 103a of the stator 101, the rotor stops at that position (the 1-phase excitation position). In other words, the 1-phase excitation position is a detent position that can maintain a stationary rotor position even when excitation is ceased.

Figure 9:
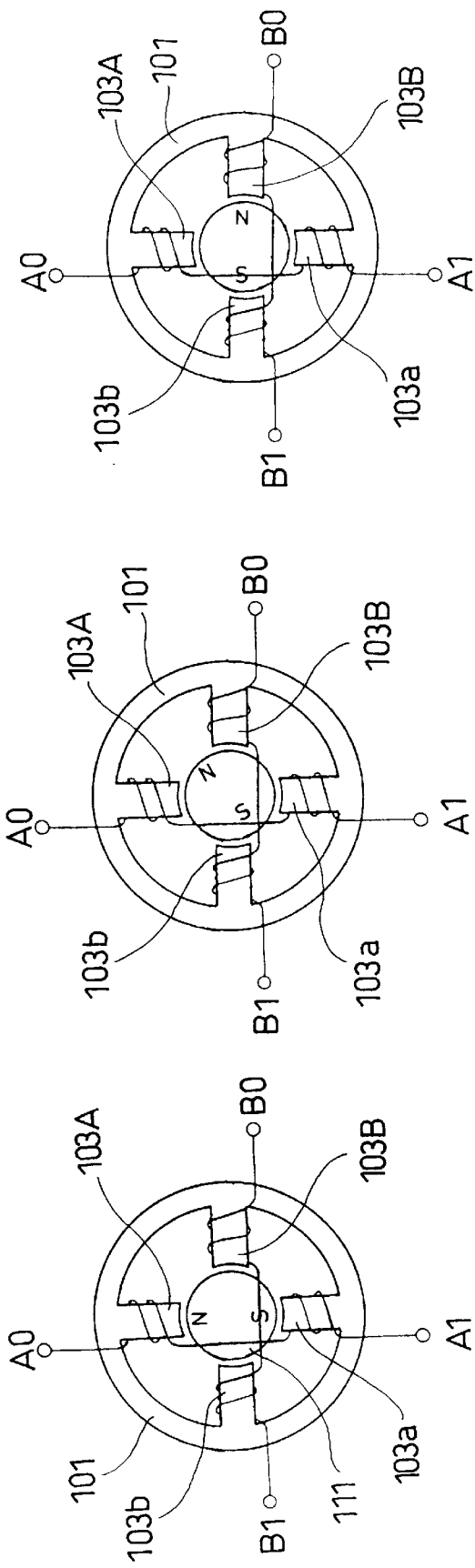
FIGS. 9A, 9B and 9C show the principle configuration and driving of a variable-phase excitation type stepping motor.
Figure 10:
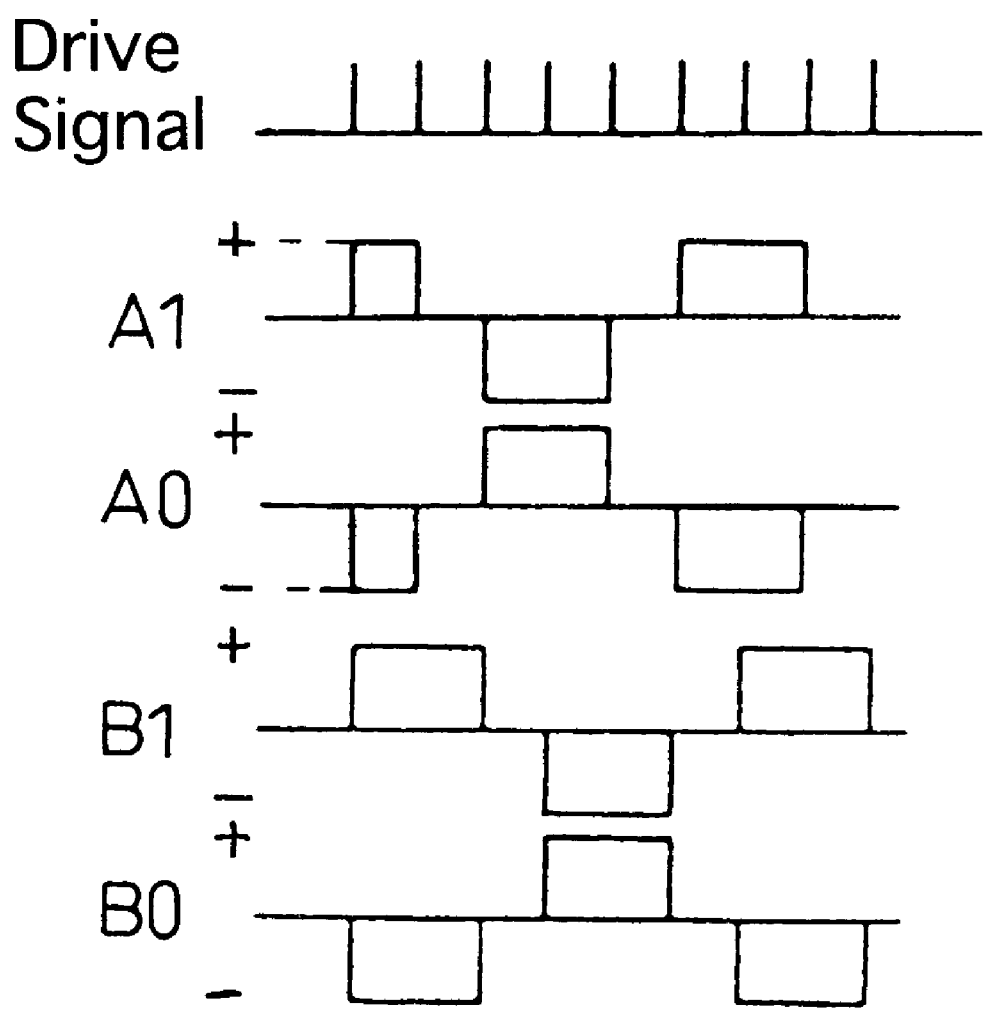
FIG. 10 is a timing chart of the variable-phase excitation type stepping motor shown in FIGS. 9A, 9B and 9C.

However, in the 2-phase excitation position of FIG. 9B, since the north pole of the rotor is attracted to poles 103A and 103B, and the south pole of the rotor is attracted to poles 103a and 103b, the north and south poles of the rotor 111 stop in between the neighboring poles 103A, 103B and 103a and 103b, respectively. When the power is cut off at the 2-phase excitation position, the north and south poles are attracted to one of the neighboring poles 103A, 103B and 103a, 103b, respectively. Hence, the rotor 111 rotates to one of each pair the above-mentioned neighboring poles of stator 101, and stops. In other words, the 2-phase excitation position is an 'equilibrium position' whereby the rotor 111 rotates to one of each pair of the neighboring detents when excitation is terminated.

It must be noted that the above explanation of the variable-phase excitation stepping motor explains the main principle and does not limit the scope thereof.

Connected to the lens CPU 70 is a second lens initial position sensor 22 for detecting whether the second lens group L2 is positioned at its initial position, a variable resistor (rheostat) 40 for detecting the absolute position of the third lens group L3, a diaphragm initial position sensor 55 for detecting whether the aperture stop 53 is positioned at its initial position (fully-opened position), and a CCD driver 77 for driving a CCD 18. Also connected to the lens CPU 70 is a zoom switch 71 having a telephoto-switch and a wide-angle-switch, a shutter release switch 72, a photometering device 73 for measuring the object brightness, an object distance measuring device 74 for detecting an object distance, a regulator 92, and a power switch 93. The CCD 18 serves as a color image pick-up device and is connected to the lens CPU 70 via the CCD driver 77. It is normal for the CCD 18 to also serve as a photometering device, hence it is generally unnecessary to provide the photometering device 73 as a separate member from the CCD 18. However, the photometering device 73 is shown as a separate member for clarity in FIG. 1. The object distance measuring device 74 can be either a passive type or an active type.

The CCD 18 is driven by the CCD driver 77 to convert an image formed on the CCD 18 into electrical image signals and output the image signals to a signal processing circuit 75. The signal processing circuit 75 converts the input signals into digital image data to store the same in an image data memory 76. The image data memory 76 can be any type of storing medium such as a built-in flash memory, a removable flash memory card or a floppy disc.

A battery 91 that supplies power to the aforementioned electronic devices can be positioned in the camera body and the battery power can be supplied to the electronic devices provided in the zoom lens portion through the regulator 92 or directly to the electronic devices provided in the zoom lens portion. However, for the purpose of simplifying the explanations about the circuit shown in FIG. 1, it is assumed that the battery 91 and the regulator 92 are provided in the zoom lens portion and that the lens CPU 70 supplies power from the battery 91 to each of the aforementioned electronic devices through the regulator 92 when the power switch 93 is turned ON.

The first, second and third lens groups L1, L2 and L3 are a positive lens group, a negative lens group and a positive lens group, respectively. The photographic lens system having these lens groups L1, L2 and L3 is of a variable-focal-length type in which the zooming operation (focal-length varying operation) is performed by shifting each of the second and third lens groups L2 and L3 in the direction of the optical axis O while the focusing operation is performed by shifting the second lens group L2. The second lens group L2 and the third lens group L3 are controlled to move relative to each other without the use of a cam. The positions of the second and third lens groups L2 and L3 are effected by an open-loop control system and a closed-loop control system, respectively, in accordance with set focal-length data (position data of the second lens group L2) and object-distance data (photographic distance data). The second lens group L2, the second stepping motor M2 and the third stepping motor M3 will also be hereinafter referred to as a focusing lens group, a focusing motor and a zoom motor, respectively.

Each of the first, second and third stepping motors M1, M2 and M3 is driven so that in each motor the rotor stops at one of a plurality of detent positions when no phase is excited. Namely, when power is cut from the motor at the moment only one phase has been excited, the rotor stops at the position at the very moment power is cut. However, when power is cut from the motor with two adjacent phases being excited, the rotor sometimes stops at the position at the very moment power is cut but tends to further rotate in a forward or reverse direction to stop at either one of the adjacent two detent positions. For this reason, in each of the motors M1, M2 and M3, when the motor in motion is controlled so as to stop the rotor at a equilibrium (stable) state between two adjacent detent positions, the corresponding two adjacent phases must be kept excited in order to maintain the rotor to stay at the equilibrium position, which increases the power consumption.

When the lens is focused on an object, a focal depth always exists. The focal depth increases the more the diaphragm closes (stops down), the further the object-distance, and the shorter the focal-length is. Therefore, in the present embodiment of the camera, if the depth of focus is large, even if the focusing lens (second lens group L2) slightly deviates from its in-focus position where the object is focused, the object can appear acceptably sharp, and the light receiving surface of the CCD 18 on which an object image is formed can be within the depth of focus. In other words, a blurred image is easily avoided.

Considering the aforementioned nature of depth of focus, in the present embodiment, the focusing motor M2 is driven to rotate its rotor stepwise when the depth of focus is smaller than a predetermined value, whereas the focusing motor M2 is driven to rotate its rotor by even-numbered steps (i.e., two-steps at a time) when the depth of focus is greater than the predetermined value. The aforementioned predetermined value is determined such that a maximum positional error or deviation of the rotor which may occur when the focusing motor M2 is driven to rotate its rotor by two-step angular units can be fallen within an acceptable limit. Namely, the aforementioned predetermined value is determined such that the light receiving surface of the CCD 18 on which an object image is formed remains within the depth of focus even if the focusing lens group L2 is moved from its in-focus position by a length by which the focusing lens group L2 moves when the rotor of the focusing motor M2 rotates by a one-step angular unit.

Figure 2:
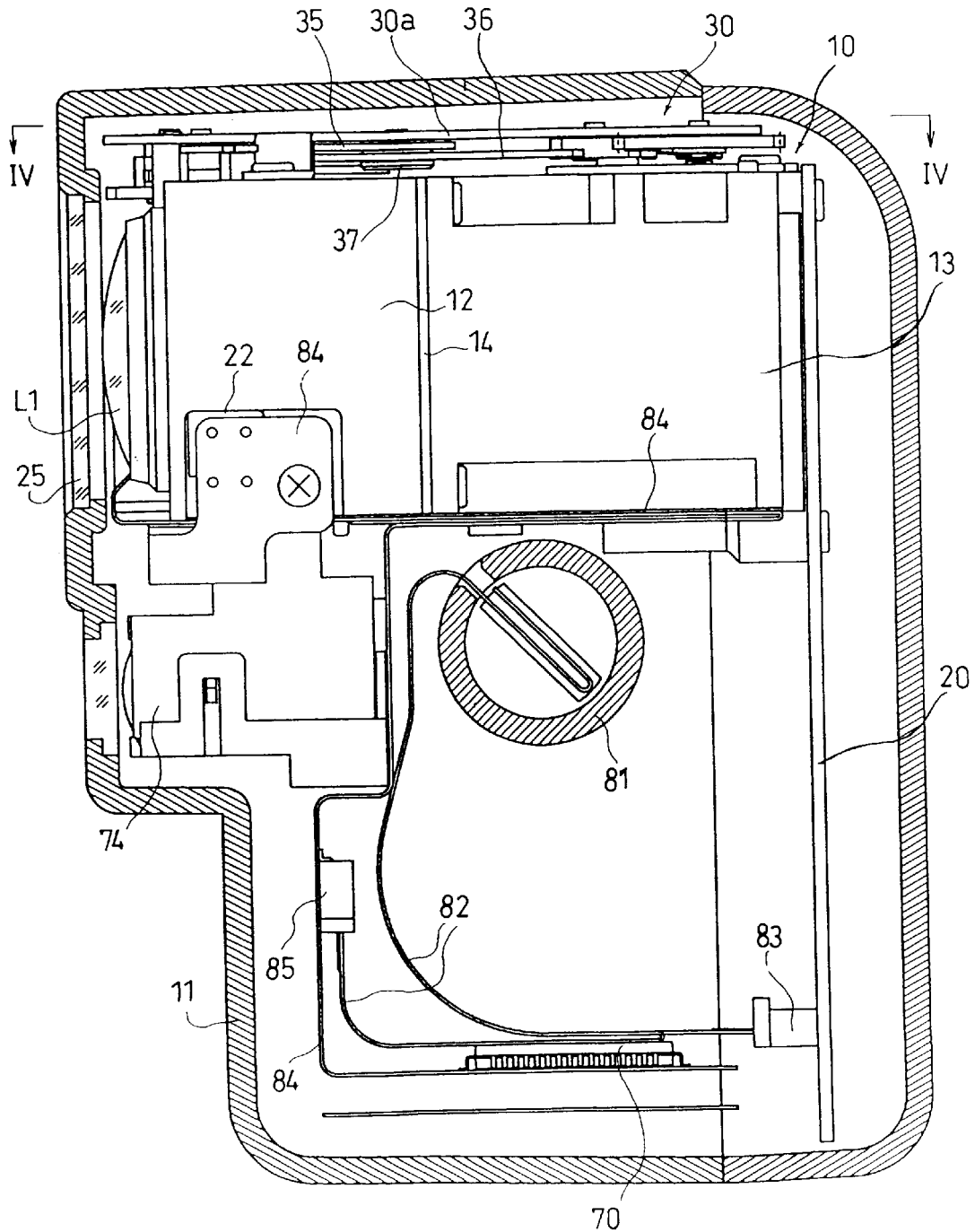
FIG. 2 is a left side view of the zoom lens portion in which the casing thereof is shown as a cross section.
Figure 3:
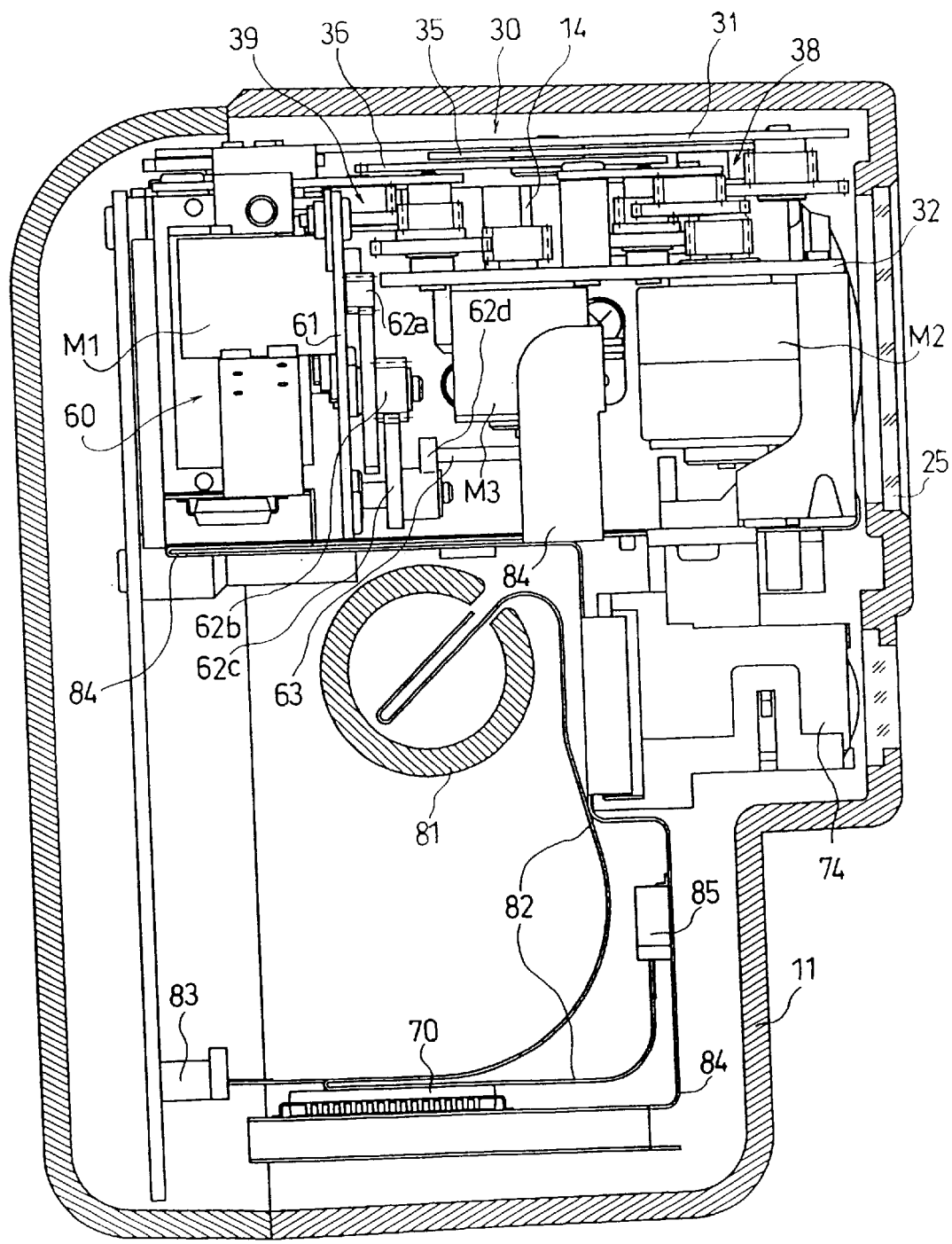
FIG. 3 is a right side view of the zoom lens portion in which the casing thereof is shown as a cross section.
Figure 4:
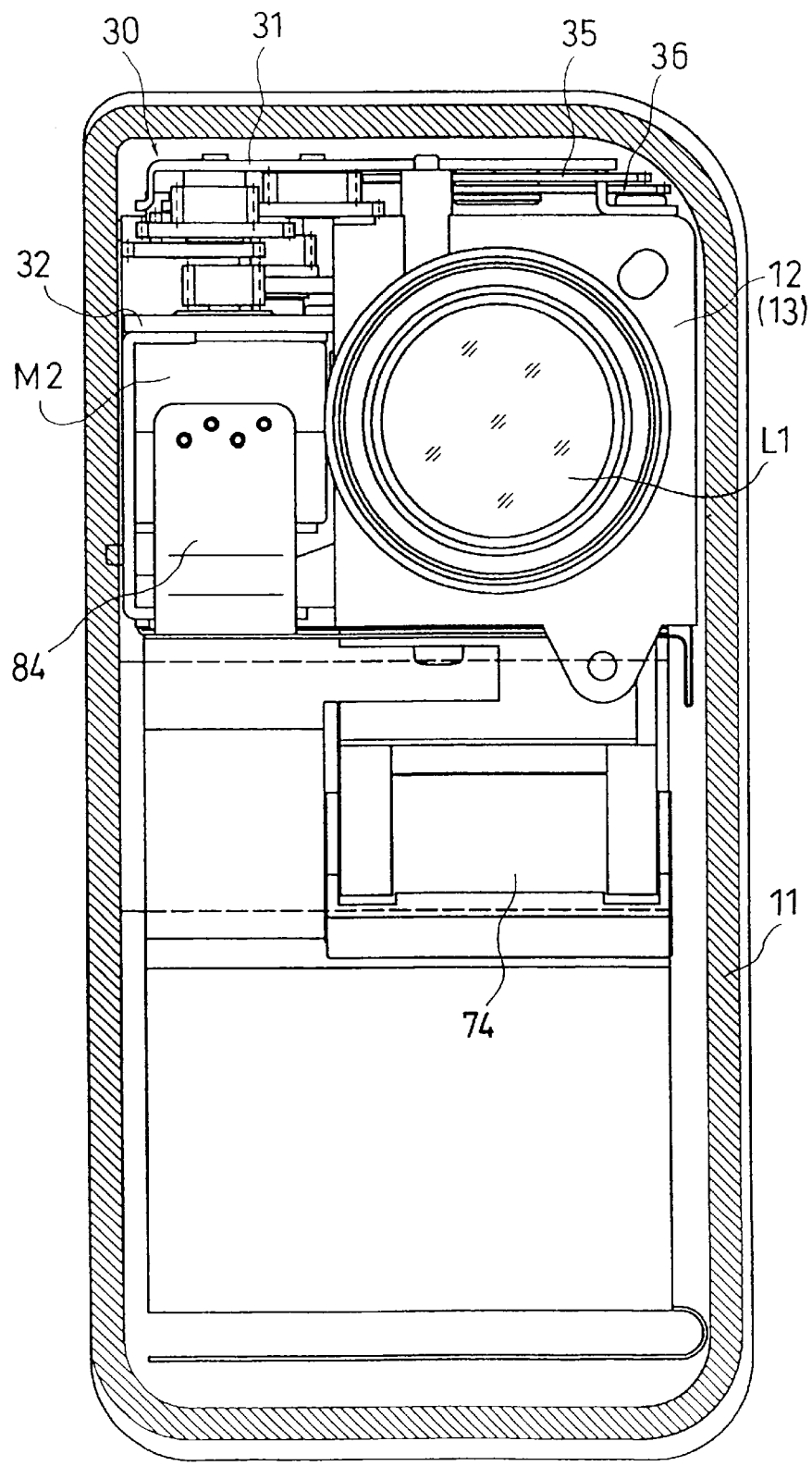
FIG. 4 is a front side view of the zoom lens portion in which the casing thereof is shown as a cross section.
Figure 5:
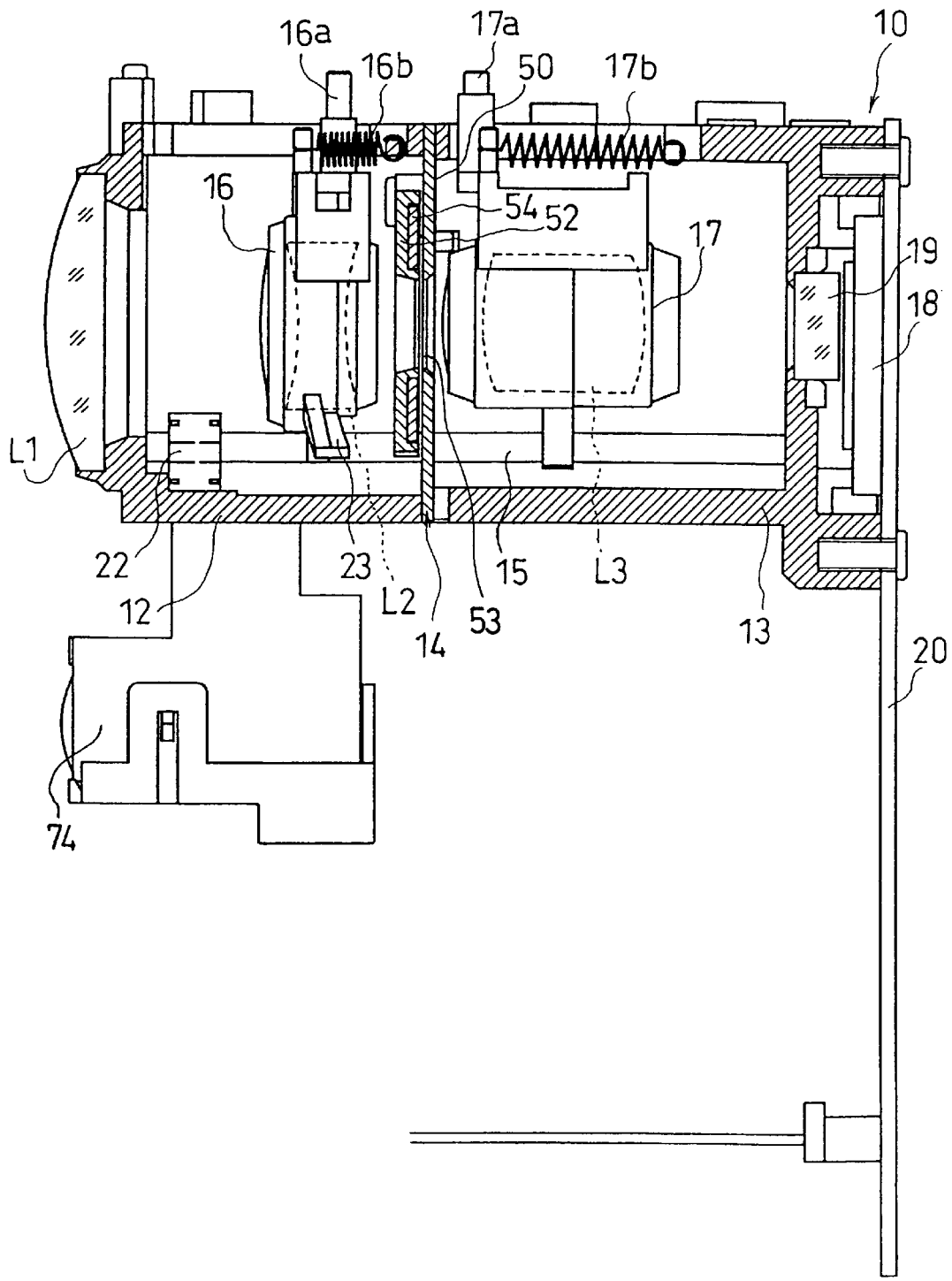
FIG. 5 is a cross sectional view of a lens unit shown in each of FIGS. 2, 3 and 4 before a lens drive unit is incorporated in the lens unit.

The overall structure of the zoom lens portion of the camera will be hereinafter discussed with reference to FIGS. 2 through 5. FIGS. 2, 3 and 4 show different elevations of the zoom lens portion. The zoom lens portion is provided with a lens casing 11 which forms the exterior of the zoom lens portion. The lens casing 11 is connected to the camera body portion (not shown) through a cylindrical boss 81 (see FIGS. 2 and 3) at a substantially central position of the lens casing so as to be rotatable relative to the camera body portion about the cylindrical boss 81 by an angle of rotation less than 360 degrees. There is provided a lens barrel body 10 fixed inside the lens casing 11. The lens barrel body 10 is essentially composed of a front plastic body 12, a rear plastic body 13 and a diaphragm block 14 positioned between the front and rear plastic bodies 12 and 13. There are a plurality of guide rods 15 (only one of which is shown in FIG. 5) which extend in parallel with the optical axis O. A second lens frame 16 which holds the second lens group L2 and a third lens frame 17 which holds the third lens group L3 are guided along the optical axis O by the plurality of guide rods 15. A base plate 20 is fixed to the rear end of the lens barrel body 10, so that the CCD 18 is secured to the rear plastic body 13 through the base plate 20. A crystal filter 19 (see FIG. 5) is fixed to the rear plastic body 13 to be positioned immediately in front of the CCD 18. A glass protection cover (plane-parallel plate) 25 is fixed to the lens casing 11 to be positioned in front of the first lens group L1.

The second lens frame 16 and the third lens frame 17 are provided with upwardly extending second and third lens pins 16a and 17a, respectively. The second and third lens frames 16 and 17 are continuously biased rearwardly towards the CCD 18 by tensile springs 16b and 17b, respectively, to remove backlash.

The front body 12 is provided with a photodetector (initial position sensor) 22 to detect whether the second lens group L2 is positioned at its initial position. The second lens frame 16 is provided with a light interceptive plate 23 secured thereto to cooperate with the photodetector 22. In the present embodiment, the initial position of the second lens group L2 is predetermined to correspond to an infinite object distance at the wide-angle extremity. When the second lens group L2 is positioned at its initial position, the light interceptive plate 23 interrupts light of the photodetector 22, so that the photodetector 22 detects that the second lens group L2 is positioned at its initial position. The amount of movement of the second lens group L2 from its initial position along the optical axis O is controlled by the lens controller 70 in accordance with the number of drive pulses for driving the second stepping motor M2. Alternatively, the amount of movement of the second lens group L2 from its initial position along the optical axis O can be controlled by the lens controller 70 in accordance with the number of pulses issued by a pulser driven by the second stepping motor M2.

In FIG. 5 the photographic lens system is in the telephoto position. When the focal-length varies from the telephoto extremity toward the wide-angle extremity, the second lens frame 16 (second lens group L2) is moved forward while the third lens frame 17 (third lens group L3) is moved rearward.

Namely, when the focal-length is changed, the second and third lens frames 16 and 17 (second and third lens groups L2 and L3) are moved always in opposite directions.

A mechanism for driving the second lens frame 16 and the third lens frame 17 is assembled as a lens drive unit 30 (see FIG. 2 or 3) which is secured to the front and rear plastic bodies 12 and 13 in the lens casing 11 such that the lens drive unit 30 extends over the front and rear plastic bodies 12 and 13.

The lens drive unit 30 is provided with upper and lower support plates 31 and 32 which are fixed to the front and rear plastic bodies 12 and 13 to lie stepwise. As can be seen in FIG. 3 the second and third stepping motors M2 and M3 are secured to the lower surface of the lower mother plate 32 such that the drive shafts of the respective motors M1 and M2 extend in a direction perpendicular to the lower support plate 32. The lens drive unit 30 is provided immediately below the upper support plate 31 with a second lens group drive plate 35 and a third lens group drive plate 36 which are parallel to the upper support plate 31. The second lens drive plate 35 is provided with a lead slot (not shown) which extends in the front and rear direction (right and lens direction as viewed in FIG. 2 or 3) of the zoom lens portion and in which the second lens cam pin 16a of the second lens frame 16 is fitted. The third lens drive plate 36 is provided with another lead slot (not shown) which extends in the front and rear direction of the zoom lens portion and in which the third lens cam pin 17a of the third lens frame 16 is fitted. The upper support plate 31 is provided with a pivotal pin 37 secured to the upper support plate 31. The second and third lens drive plates 35 and 36 are pivoted about the pivotal pin 37.

The lens drive unit 30 is further provided between the upper and lower support plates 31 and 32 with a first gear mechanism 38 which transmits the rotation of the second stepping motor M2 to the second lens drive plate 35; a second gear mechanism 39 which transmits the rotation of the third stepping motor M3 to the third lens drive plate 36; and the variable resistor 40 which is associated with the third lens group drive plate 36 so that the resistance value of the variable resistor 40 is changed correspondingly by the movement of the third lens drive plate 36. The lens controller 70 receives the resistance value from the variable resistor 40 to convert the received resistance value into positional information for the third lens group L3.

The diaphragm block 14 is driven by a drive unit 60 (see FIG. 3) fixed to the rear plastic body 13 and is fixed to a plate 50 (see FIG. 5) held between the front and rear plastic bodies 12 and 13. The diaphragm block 14 is provided with a retainer 52 secured to the plate 50; the aperture stop 53 consisting of a plurality of sector blades each rotatably supported by the retainer 52; a drive ring 54 for opening and closing the aperture stop 53; and the aforementioned diaphragm initial position sensor 55 (not shown in FIG. 5 [see FIG. 1]). The lens controller 70 determines whether the aperture stop 53 lies at its initial position (i.e., whether the aperture stop 53 is fully opened) through the diaphragm initial position sensor 55.

The diaphragm drive unit 60 is constructed as a separate unit and is secured to the rear plastic body 13 at a position different from that of the diaphragm block 14 (i.e., is neither in the direction of the optical axis O nor in a radial direction). The first stepping motor M1, which drives the aperture stop 53, is secured to a support plate 61 of the diaphragm drive unit 60. A first pinion 62a secured to the output shaft of the first stepping motor M1 meshes with a large gear portion of a composite gear 62b, and a small gear portion of the composite gear 62b meshes with a sector gear 62c, so that the rotation of the first pinion 62a is transmitted to the sector gear 62c via the composite gear 62b. The sector gear 62c is provided with a radial arm 62d integrally formed therewith. The radial arm 62d is provided with an association pin 63 which extends forwardly (towards to the right as viewed in FIG. 3) to be fitted in a radial association slot (not shown) formed on a drive shaft (not shown) connected to the drive ring 54. Due to such a structure, the rotation of the first stepping motor M1 causes the drive ring 54 to rotate to thereby open or close the aperture stop 53. The first stepping motor M1 is controlled such that its rotor always stops at a detent position.

The zoom switch 71 and the shutter release switch 72 can be arranged on the camera body portion while the signal processing circuit 75 and the image data memory 76 can be arranged in the camera body portion. Further, the camera body portion can be provided with a color LCD finder on which the object image formed on the CCD 18 is displayed, a body controller which comprehensively controls the camera body portion, and various function switches. Electrical circuits provided in the zoom lens portion and electrical circuits provided in the camera body portion are electrically connected with each other through a flexible printed-circuit strip 82 (see FIG. 2 or 3) which extends from the interior of the camera body portion to the interior of the zoom lens portion through the cylindrical boss 81. One end of the flexible printed-circuit strip 82 which is positioned in the lens casing 11 is bifurcated to be connected to a connector 83 provided on the base plate 20 and a connector 85 provided on a flexible printed-circuit board 84 positioned in the lens casing 11. The flexible printed-circuit board 84 is provided thereon with a printed circuit to which all the electrical elements within the lens casing 11 are connected and electronic devices including the lens CPU 70.

Considering that the position of the second lens group (focusing lens group) L2 for bringing an object into focus is determined by the position of the third lens group (namely, a set focal-length) and the object distance information determined by the object distance measuring device 74, in the present embodiment, a data table containing data of positions of the second lens group L2 (data of the number of drive pulses for driving the second stepping motor M2 from its initial position) which are each determined by the corresponding combination of a set focal-length with a determined object distance information, is prepared by calculation or actual measurements and is stored in an EEPROM 100 provided in the lens CPU 70. The data table may be stored in other type of memory. When the lens CPU 70 controls the photographic lens system to bring an object into focus, the lens CPU 70 inputs the data of the data table to find an optimum position of the second lens group L2 to obtain an in-focus state, namely, to determine the number of drive pulses for driving the second stepping motor M2 from its initial position.

In the present embodiment the aforementioned data table is prepared both for driving the second stepping motor M2 stepwise when the depth of focus is smaller than the aforementioned predetermined value and for driving the second stepping motor M2 by even-numbered steps when the depth of focus is greater than the aforementioned predetermined value. Namely, two types of data tables (first and second data tables) are prepared. For the first data table for driving the second stepping motor M2 stepwise, each number of drive pulses in the data table is determined to be an integer. For the second data table for driving the second stepping motor M2 by even-numbered pulses, each number of drive pulses in the data table is determined to be a multiple of two. These first data and second data are stored in the EEPROM 100.

Alternatively, in the case where the second stepping motor M2 is driven by even-numbered steps, the number of drive pulses for driving the second stepping motor M2 can be determined to be an integer, and the determined number of drive pulses can be rounded up or down when the determined number is an odd number. In the case of a photographic lens, depth of focus usually extends further behind the distance for which the lens is focused than in front. Due to this, in this alternative embodiment, the aforementioned determined number of drive pulses is rounded when the determined number is an odd number because the second stepping motor M2 drives the second lens group L2 to move from its infinite-distance focusing position (the initial position of the second lens group L2) towards its near-distance focusing position.

Data table containing data of the relationship between the optimum aperture value determined in accordance with the object brightness value measured by the photometering device 73 and the number of drive pulses for driving the first stepping motor M1 is prepared, and the lens CPU 70 inputs and sets an optimum number of pulses from the data table when driving the first stepping motor M1.

The depth of focus is determined by a set focal-length, an object distance and a set optimum aperture value (aperture value AV of APEX system or f-number). In the present embodiment, in order to determine whether the depth of focus is greater or smaller than the predetermined value, it is not necessary to determine an actual value or length of depth of focus. That is, it is sufficient to determine only whether the value of a current depth of focus is greater or smaller than the predetermined value. Due to this, in the present embodiment, a data table (third data table) containing data of threshold aperture values for respective combinations of focal-lengths of the zoom lens with object distances, and each of the threshold aperture values is determined such that the depth of focus is always greater than the predetermined value. Each of the threshold aperture values may be of an f-number. The third data table may be made of a matrix having coordinates of a column of set focal-length and a line of object distance, and the aforementioned threshold aperture values are respectively arranged at points of intersections (or rectangular spaces of grid) of the matrix. The third data table made in such a manner is stored in the EEPROM 100, together with the aforementioned first and second data tables.

In the present embodiment, at the time of taking a picture, the lens CPU 70 inputs the data of the third data table from the EEPROM 100 to determine whether the depth of focus is greater than the predetermined value by comparing an f-number specified from the third data table (threshold aperture value) with an optimum f-number (aperture value).

Thereafter, in the case where it is determined that the depth of focus is greater than the predetermined value, i.e., in the case of a long depth of focus, the aforementioned second data table stored in the EEPROM 100 is used to determine the number of pulses for driving the second stepping motor M2. Conversely, in the case where it is determined that the depth of focus is smaller than the predetermined value, i.e., in the case of a short depth of focus, the aforementioned first data table stored in the EEPROM 100 is used to determine the number of pulses for driving the second stepping motor M2.

The number of pulses determined using the second data table stored in the EEPROM 100 is always an even number, so that the rotor of the second stepping motor M2 always stops at any one of the detent positions whenever the second stepping motor M2 in motion is stopped, which makes it possible to cut the power from the second stepping motor M2 to stop the same. Therefore, due to such a control unique to the present embodiment, the photographic lens system of the present embodiment can be brought into focus with an object being within the depth of focus while consuming less power, increasing the service life of the battery 91.

On the other hand, when the number of pulses is determined using the first data table stored in the EEPROM 100, since the number of pulses for driving the second stepping motor M2 can be determined as an integer and the second stepping motor M2 is driven stepwise, a focusing operation of a high precision can be performed.

In the present embodiment, it can be understood from the foregoing that it is determined whether the depth of focus is long or short by comparing an optimum aperture value (optimum f-number) with a threshold aperture value (threshold f-number) specified by a combination of a set focal-length with an object distance. However, the three parameters (focal-length, object distance and aperture value) may be used in any other combination to obtain the same result. For instance, it can be determined whether the depth of focus is long or short by comparing a measured object distance with a threshold object distance specified by a combination of a set focal-length with an optimum aperture value, or by comparing a set focal-length with a threshold focal-length specified by a combination of an optimum aperture value with an object distance.

Figure 6:
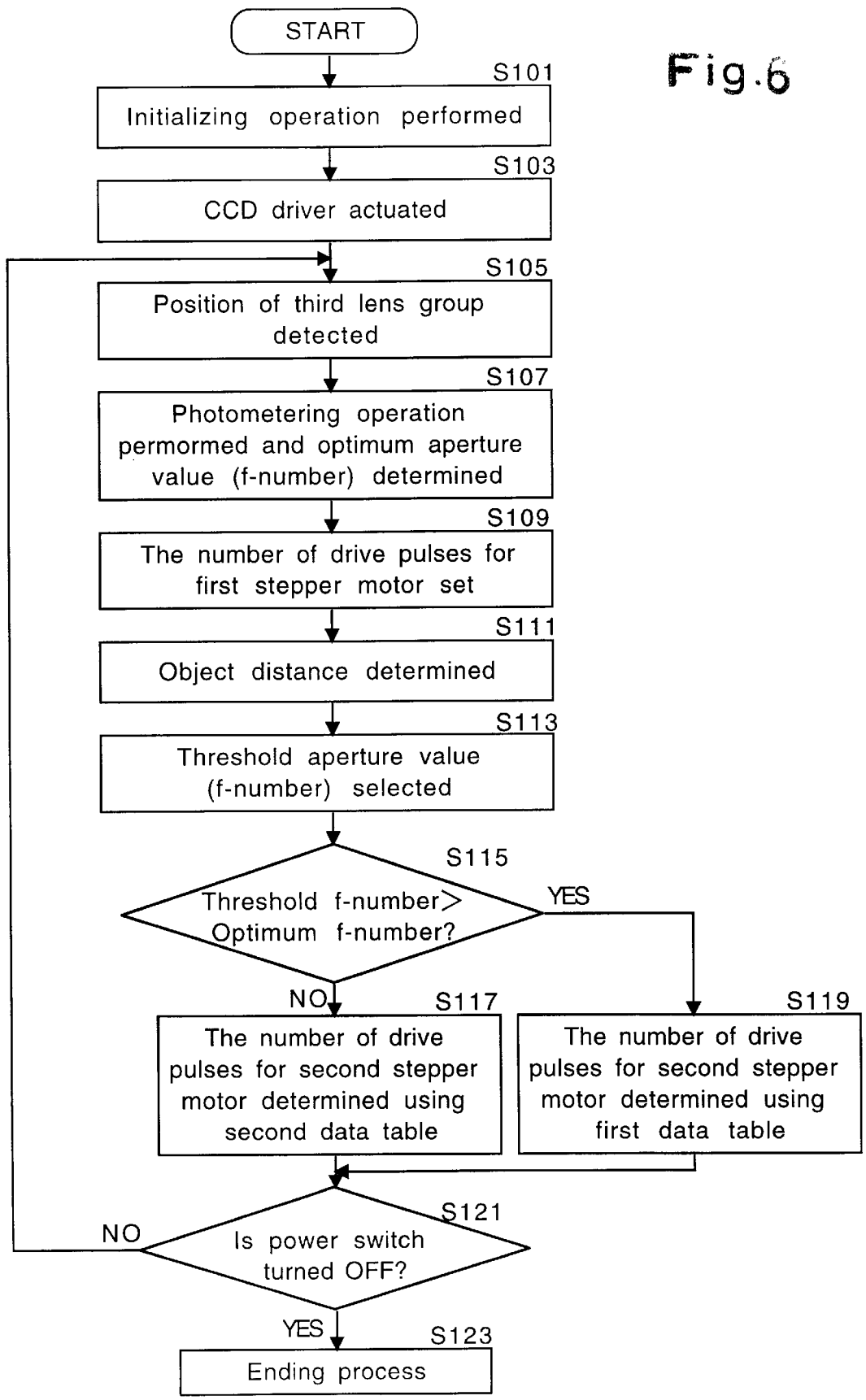
FIG. 6 is a flow chart showing an embodiment of a fundamental operation of the digital still camera to which the present invention is applied.

The operation of the lens controller 70 will be hereinafter discussed with reference to FIGS. 6 through 8. FIG. 6 shows a flow chart showing an embodiment of a series of operations in which the photometering process and the auto-focusing process are repeatedly performed while the power switch 93 is ON. In this embodiment, during the time the photometering process and the auto-focusing process are being performed, the first and second stepping motors M1 and M2 are driven by a timer-interrupt process shown in FIGS. 7 and 8, while the second and third stepping motors M2 and M3 are driven by an interrupt of the zoom switch 71. Subsequently an image of object obtained through the CCD 18 is stored in the image data memory 76 upon the shutter release switch 72 being turned ON.

The lens controller 70 starts operating (entering the flow chart shown in FIG. 6) upon the power switch 93 being turned ON, i.e., upon a photographic mode being selected. First of all, the lens CPU 70 performs an initializing operation in which an internal RAM and some other elements are initialized, and subsequently drives the first, second and third stepping motors M1, M2 and M3 to rotate respective rotors to their initial positions (step S101). Theses initial positions are all preset as detent positions. In such an initializing process of step S101, the first stepping motor M1 drives the aperture stop 53 to be positioned at its initial position (fully-opened position) while the second and third stepping motors M2 and M3 respectively move the second and third lens groups L2 and L3 to their initial positions.

Thereafter the lens controller 70 actuates the CCD driver 77 to drive the CCD 18 so that the CCD 18 starts performing an image pick-up operation (step S103). Once the CCD driver 77 is actuated, the CCD driver 77 repeats performing the image pick-up operation until a stop command is received or the power is cut.

After the CCD driver 77 is actuated, the lens controller 70 detects an absolute position of the third lens group L3 using the variable resistor 40 (step S105). Thereafter the lens controller 70 actuates the photometering device 73 to perform a photometering operation and determines an optimum aperture value (or an optimum f-number) in accordance with a measured brightness and a set focal-length (step S107). Then the lens controller 70 converts the determined optimum aperture value into the corresponding number of drive pulses to set the same as the number of drive pulses for driving the first stepping motor M1 from its initial position (step S109). This set number of drive pulses is always an even number. Thereafter the lens controller 70 actuates the object distance measuring device 74 to determine an object distance (Step S111).

Since a focal-length, an optimum aperture value or f-number and an object distance are all obtained through the aforementioned processes from step S101 to step S111, the lens controller 70 selects a threshold aperture value or f-number from the aforementioned third data table stored in the EEPROM 100 (step S113). Then the lens controller 70 compares the selected threshold f-number with an optimum f-number to determine whether the selected threshold f-number is larger than the optimum f-number (or compares the selected threshold aperture value with an optimum aperture value to determine whether the selected threshold aperture value is less than the optimum aperture value) (step S115). In the case where it is determined at step S115 that the selected threshold f-number is not greater than the optimum f-number, control proceeds to step S117 at which the lens controller 70 determines and sets the number of drive pulses for driving the second stepping motor M2 with the use of the aforementioned second data table because the depth of focus is greater than the predetermined value (step S117). Therefore, the second stepping motor M2 is driven by even-numbered steps. Conversely, in the case where it is determined at step S115 that the selected threshold f-number is grater than the optimum f-number, control proceeds to step S119 at which the lens controller 70 determines and sets the number of drive pulses for driving the second stepping motor M2 with the use of the aforementioned first data table because the depth of focus is less than the predetermined value (step S119). Therefore, the second stepping motor M2 is driven by single steps.

The aforementioned operations from step S105 through S121 are repeated unless the power switch 93 is turned OFF. After the operation at step S117 or S119, it is determined at step S121 whether the power switch 93 is OFF. The lens controller 70 performs an ending process to stop the operation of the lens controller 70 (step S123) when it is determined at step S121 that the power switch 93 has been turned OFF. Conversely, when it is determined at step S121 that the power switch 93 has not been yet turned OFF, control returns to step S105. The ending process performed at step S123 includes at least a power-cut-off process and an ending process for stopping the CCD driver 77 and may further include a process for moving all the rotors of the motors M1, M2 and M3 to their respective initial positions.

Figure 7:
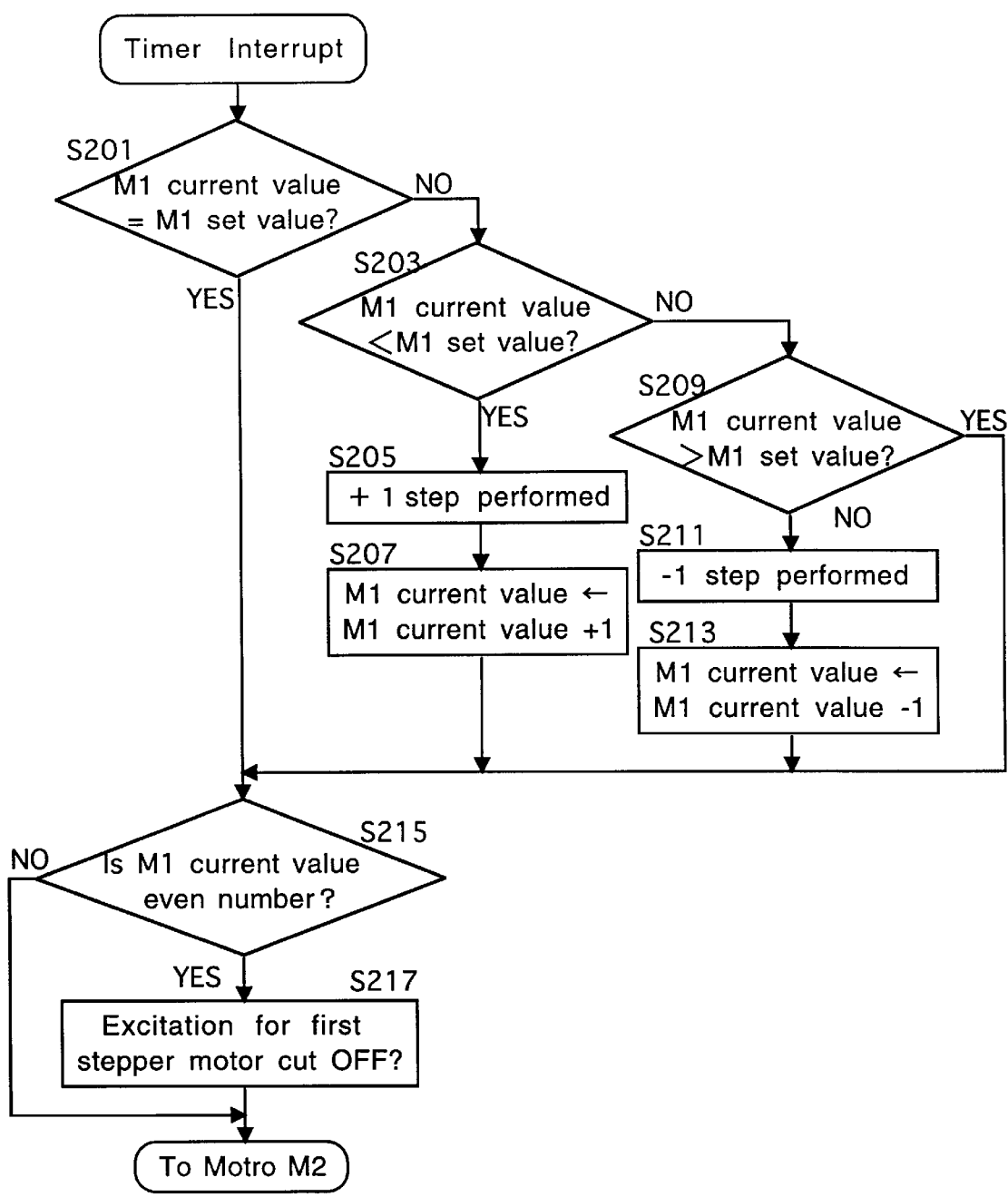
FIG. 7 is a flow chart showing an embodiment of a timer-interrupt process for a first stepping motor.
Figure 8:
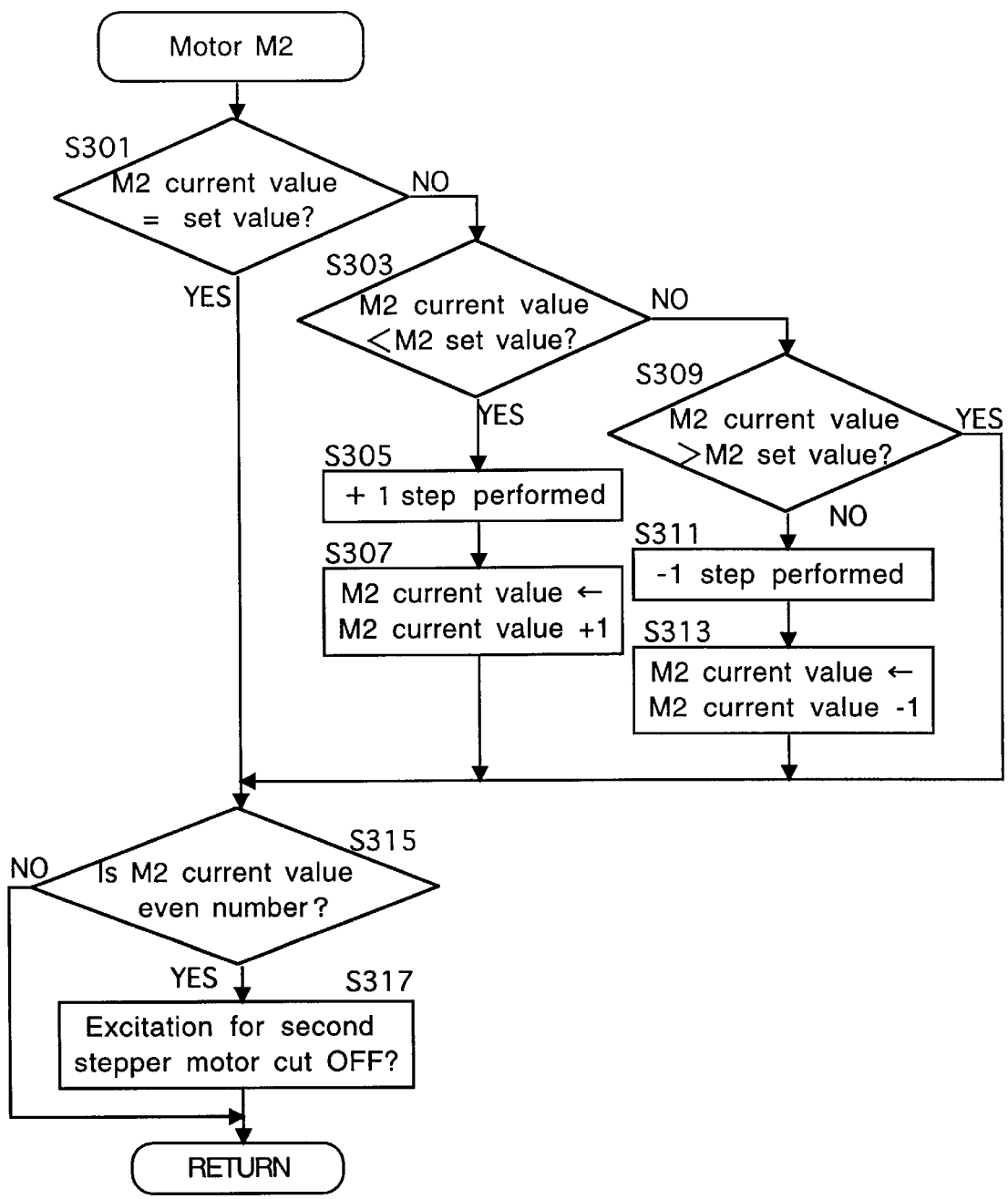
FIG. 8 is a flow chart showing an embodiment of a timer-interrupt process for a second stepping motor.

During the time the aforementioned operations from step S105 to step S121 are repeated, the first and second stepping motors M1 and M2 are driven by the timer-interrupt process shown in FIGS. 7 and 8. This timer-interrupt process will be hereinafter discussed with reference to the flow chart shown in FIGS. 7 and 8.

The number of drive pulses for driving the first stepping motor M1 which is set at step S109 will be hereinafter referred to as an "M1 set value". The number of drive pulses for driving the second stepping motor M2 which is set at step S117 or S119 will be hereinafter referred to as an "M2 set value". The number of drive pulses used for driving the first stepping motor M1 from the initialized point will be hereinafter referred to as an "M1 current value" while the number of drive pulses used for driving the second stepping motor M2 from the initialized point will be hereinafter referred to as an "M2 current value". Similarly, the number of drive pulses used for driving the third stepping motor M3 from the initialized point will be hereinafter referred to as an "M3 current value".

In the timer-interrupt process, it is checked whether the M1 current value is equal to the M1 set value (at step S201). In the case where it is checked at step S201 that the M1 current value is not equal to the M1 set value, control proceeds to step S203 at which it is checked whether the M1 current value is smaller than the M1 set value. In the case where it is checked at step S203 that the M1 current value is smaller than the M1 set value, control proceeds to step S205 at which the rotor of the first stepping motor M1 is further rotated by one step in a forward rotational direction (i.e., by exciting the first stepping motor M1 to rotate its rotor by a step of +1) and subsequently the M1 current value is increased by one at step S207. Thereafter control proceeds to step S215.

In the case where it is checked at step S203 that the M1 current value is not smaller than the M1 set value, control proceeds to step S209 at which it is checked whether the M1 current value is greater than the M1 set value. In the case where it is checked at step S209 that the M1 current value is not greater than the M1 set value, control proceeds to step S215. Otherwise control proceeds to step S211 at which the rotor of the first stepping motor M1 is reversely rotated by one step (i.e., by exciting the first stepping motor M1 to rotate its rotor by a −1 step) and subsequently the M1 current value is decreased by one at step S213. Thereafter control proceeds to step S215.

In the case where it is checked at step S201 that the M1 current value is equal to the M1 set value, control proceeds to step S215.

It is checked at step S215 whether the M1 current value is an even number. If so, since it means that the rotor of the first stepping motor M1 is currently stopped at a detent position, control proceeds to step S217 at which the excitation for the first stepping motor M1 is stopped (i.e., power is cut from the first stepping motor M1). In the case where at step S215 the M1 current value is not an even number, since it means that the rotor of the first stepping motor M1 currently stops at a position between two adjacent detent positions, control proceeds to step S301 shown in FIG. 8, without cutting power from the first stepping motor M1. Namely, the excitation for the first stepping motor M1 is stopped whenever the M1 current value is an even number, i.e., when the rotor of the first stepping motor M1 stays at any one of detent positions.

Steps S301 through S317 are operations for the second stepping motor M2. It is checked at step S301 whether the M2 current value is equal to the M2 set value. If at step S301 the M2 current value is not equal to the M2 set value, control proceeds to step S303 at which it is checked whether the M2 current value is smaller than the M2 set value. If at step S303 the M2 current value is smaller than the M2 set value, control proceeds to step S305 at which the rotor of the second stepping motor M2 is further rotated by one step in a forward rotational direction (i.e., by exciting the second stepping motor M2 to rotate its rotor by a step of +1) and subsequently the M2 current value is increased by one at step S307. Thereafter control proceeds to step S315.

If at step S303 the M2 current value is not smaller than the M2 set value, control proceeds to step S309 at which it is checked whether the M2 current value is greater than the M2 set value. If at step S309 the M2 current value is not greater than the M2 set value, control proceeds to step S315. Otherwise, the case control proceeds to step S311 at which the rotor of the second stepping motor M2 is reversely rotated by one step (i.e., by exciting the second stepping motor M2 to rotate its rotor by a minus one step) and subsequently the M2 current value is decreased by one at step S313. Thereafter control proceeds to step S315.

If at step S301 the M2 current value is equal to the M2 set value, control proceeds directly to step S315.

It is checked at step S315 whether the M2 current value is an even number. If at step S315 the M2 current value is an even number, since it means that the rotor of the second stepping motor M2 is currently stopped at a detent position, control proceeds to step S317 at which the excitation for the second stepping motor M2 is stopped (i.e., power cut removed from the second stepping motor M2). If at step S315 the M2 current value is not an even number, since it means that the rotor of the second stepping motor M2 currently stops at a position between two adjacent detent positions, control is returned, without removing all power from the second stepping motor M2. Namely, the excitation for the second stepping motor M1 is stopped whenever the M1 current value is an even number, i.e., when the rotor of the second stepping motor M2 stays at any one of detent positions.

In the aforementioned operation of the lens controller 70, the number of drive pulses for driving the second stepping motor M2 (the M2 set value) is set by taking it into account whether the depth of focus is long or short (i.e., by using either the aforementioned first or second data table stored in the EEPROM 100) before the second stepping motor M2 is driven. However, another operation of the lens controller 70 which is different from the aforementioned operation of the lens controller 70 in the control for the second stepping motor M2 can be adopted. In this operation, the number of drive pulses for driving the second stepping motor M2 (the M2 set value) is set by using only the first data table stored in the EEPROM 100 regardless of depth of focus being long or short, and operations similar to the operations at steps S305, S307, S315 and S317 are performed in the case of depth of focus being detected to be long. Namely, in the case where the M2 current value is an odd number while depth of focus is long, in order to render the photographic lens system to have a state of front focus relative to an object which is to be photographed, the rotor of the second stepping motor M2 is further rotated by one step in a forward rotational direction and subsequently the M2 current value is increased by one to thereby make the M2 current value an even number. Thereafter the excitation for the second stepping motor M2 is stopped. Alternatively, in the case where the M2 current value is an odd number while depth of focus is long, the rotor of the second stepping motor M2 may be further rotated in either a forward or reverse rotational direction by one step and subsequently the M2 current value may be increased or decreased by one to thereby make the M2 current value an even number. Thereafter the excitation for the second stepping motor M2 is stopped.

During the time the lens controller 70 performs all the aforementioned operations shown in FIGS. 6, 7 and 8, the lens controller 70 starts performing an interrupt process (zooming operation) for driving each of the second and third stepping motors M2 and M3 by even-numbered steps upon the zoom switch being operated. This interrupt process will be hereinafter discussed.

In the case where the photographic lens system is in the telephoto position as shown in FIG. 5, when the zoom switch 71 is operated to turn the wide-angle-switch thereof ON, the lens controller 70 starts performing an interrupt process (image-size reducing operation) in which the second lens frame 16 (second lens group L2) is moved forwardly by the second lens stepping motor M2 by even-numbered steps and at the same time the third lens frame 17 (third lens group L3) is moved rearwardly by the third lens motor M3 by even-numbered steps. In this case of moving the second and third lens groups in opposite directions away from each other, every time the lens controller 70 controls the second stepping motor M2 and the third stepping motor M3 to rotate the rotor thereof by two steps, the lens controller 70 decreases the M2 current value and the M3 current value by two, respectively. When the zoom switch 71 is operated to turn the wide-angle-switch thereof OFF, i.e., when the lens controller 70 receives a command to stop performing the zooming operation, the lens controller 70 stops the second and third stepping motors M2 and M3 by cutting the power from each of the second and third stepping motors M2 and M3 because each of the M1 and M2 current values is an even number, i.e., because each of the second and third stepping motors M2 and M3 stops at a detent position.

Conversely, when the zoom switch 71 is operated to turn the telephoto switch thereof ON, the lens controller 70 starts performing an interrupt process (image-size enlarging operation) in which the second lens frame 16 (second lens group L2) is moved rearwardly by the second lens stepping motor M2 by even-numbered steps and at the same time the third lens frame 17 (third lens group L3) is moved forwardly by the third lens motor M3 by even-numbered steps. In this case of moving the second and third lens groups in opposite directions to approach each other, every time the lens controller 70 controls the second stepping motor M2 and the third stepping motor M3 to rotate the rotor thereof by two steps, the lens controller 70 increases the M2 current value and the M3 current value by two, respectively. When the zoom switch 71 is operated to turn the telephoto switch OFF, i.e., when the lens controller 70 receives a command to stop performing the zooming operation, or when the second and third lens groups L2 and L3 respectively reach their telephoto extremities, the lens controller 70 stops the second and third stepping motors M2 and M3 when the M2 current value and the M3 current value are even numbers, respectively. Namely, the lens controller 70 stops each of the second and third stepping motors M2 and M3 at a detent position by removing all power from each of the second and third stepping motors M2 and M3 when each of the M2 and M3 current values is an even number.

It should be noted that it is unnecessary to count the number of drive pulses for driving the third stepping motor M3 because the axial position of the third lens group L3 can be detected using the variable resistor 40.

The lens controller 70 controls each of the first and second stepping motors M1 and M2 in accordance with the focal-length set by the aforementioned zooming operation. The number of drive pulses for driving the first stepping motor M1 is determined and set in accordance with the object brightness information obtained through the photometering device 73, and the sector blades of the aperture stop 53 is driven to stop down from its initial position by the first stepping motor M1 in accordance with the set number of drive pulses for driving the first stepping motor M1. Further, the number of drive pulses for driving the second stepping motor M2 is determined and set in accordance with the object distance information obtained through the object distance measuring device 74, and the second lens group L2 is driven to move from its initial position by the second stepping motor M2 in accordance with the set number of drive pulses for driving the second stepping motor M2 so as to bring an object into focus. Namely, when the position of the third lens group L3 is determined, that is, when the focal-length of the photographic lens system is determined by operating the zoom switch 71, the position of the second lens group L2 is determined in accordance with the set focal-length and the object distance information obtained by the object distance measuring device 74. Thus, an in-focus object image is formed on the CCD 18.

In the present embodiment it has been mentioned above that the operations of the lens controller 70 shown in FIGS. 6 through 8 are performed on the condition that the power switch 93 is ON. However, only the operation at step S101 may be performed on the condition that the power switch 93 is ON. In this case, when the zoom switch 71 is turned ON, the lens controller 70 performs the zooming operation by driving the second and third stepping motors M2 and M3 whereas the lens controller 70 does not yet perform the timer-interrupt process shown in FIGS. 7 and 8. When the shutter release switch 72 is turned ON (e.g., the shutter release switch 72 is half depressed) while the power switch is ON, the lens controller 70 performs the operations at (and after) step S103 and also the timer-interrupt process shown in FIGS. 7 and 8. Further, the operation at step S121 is replaced by a different operation at which it is checked whether the shutter release switch 72 is turned OFF. According to such modified operations, power consumption can be much more reduced.

As can be understood from the foregoing, according to the present embodiment of digital still camera, since the second stepping motor M2 is controlled such that the rotor thereof always stops at any one of a plurality of detent positions whenever the second stepping motor M2 in motion is controlled to stop, all power can be removed from the second stepping motor M2 whenever the second stepping motor M2 in motion is stopped, which increases the service life of the battery 91.

Although in the illustrated embodiment the present invention is applied to a digital still camera, the present invention can also be applied to any other type of camera as long as the camera is of a type using a stepping motor for driving a focusing lens group.

Although in the illustrated embodiment the camera is divided into two portions, i.e., the camera body portion and the zoom lens portion, the camera can be constructed as a single body including the camera body portion and the zoom lens portion.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An auto-focusing device of a camera, comprising:
   a photographic lens having a focusing lens group guided along an optical axis;
   a stepping motor for moving said focusing lens group along said optical axis to bring an object into focus; and
   a controller which controls said stepping motor to rotate stepwise when the depth of focus is smaller than a predetermined value and for controlling said stepping motor to rotate by even-numbered steps when said depth of focus of said photographic lens is greater than said predetermined value.

2. An auto-focusing device according to claim 1, wherein said stepping motor is a 1–2 phase excitation type stepping motor having a rotor, and the 1-phase excitation position of said rotor, when stopped, is at a detent position;
   and a 2-phase excitation position of said rotor, when stopped, is an equilibrium position, so that said rotor rotates to one of the neighboring detent positions when 2-phase excitation is terminated.

3. The auto-focusing device according to claim 2, wherein said controller controls said stepping motor to stop at any one of a plurality of detent positions of said rotor when said depth of focus is smaller than said predetermined value.

4. An auto-focusing device of a camera, comprising:
   a photographic lens having a focusing lens group guided along an optical axis;
   a stepping motor for moving said focusing lens group along said optical axis to bring an object into focus; and
   a controller which controls said stepping motor;
   wherein said stepping motor is a 1–2 phase excitation type stepping motor, and said stepping motor stops at a 1-phase excitation position, which is at a detent position, when said 1-phase excitation is terminated;
   and said stepping motor stops at an equilibrium state which is at a 2-phase excitation position between neighboring detent positions, so that said stepping motor rotates to one of said neighboring detent positions when said 2-phase excitation is terminated;
   wherein said controller controls said stepping motor to rotate stepwise and stops at either said detent position or said equilibrium state when the depth of focus is smaller than a predetermined value and for controlling said stepping motor to rotate and stop at said detent position when said depth of focus of said photographic lens is greater than said predetermined value.

5. The auto-focusing device according to claim 2, wherein said photographic lens is a zoom lens.

6. The auto-focusing device according to claim 5, further comprising:
   a photometering device for measuring the brightness of said object;
   an aperture-value determining device for determining an aperture value in accordance with said brightness measured by said photometering device;
   an object distance measuring device for measuring the object distance of said object; and
   a focal-length detecting device for detecting the focal-length of said zoom lens,
   wherein said controller comprises means for determining whether said depth of focus is greater or smaller than said predetermined value in accordance with said aperture value determined by said aperture-value determining device and said focal-length detected by said focal-length detecting device.

7. The auto-focusing device according to claim 6, further comprising a memory for storing a data table containing data of threshold aperture values for respective combinations of focal-lengths of said zoom lens with object distances, each of said threshold aperture values being determined such that said depth of focus is always greater than said predetermined value.

8. The auto-focusing device according to claim 7, wherein said determining means first selects one of said threshold aperture values in accordance with said aperture value determined by said aperture-value-determining device and said focal-length detected by said focal-length detecting device and subsequently compares said selected one of said threshold aperture values with said aperture value determined by said aperture value to determine whether said depth of focus is greater or smaller than said predetermined value.

9. The auto-focusing device according to claim 8 wherein said controller can determine whether the number of drive pulses for driving said stepping motor is an integer, so as to rotate stepwise from an initial position in accordance with said aperture value determined by said aperture-value-determining device and said focal-length detected by said focal-length detecting device, and wherein said controller can determine whether said number of drive pulses for driving said stepping motor is a multiple of two.

10. The auto-focusing device according to claim 2, wherein said controller can determine whether the number of drive pulses for driving said stepping motor is an integer, and wherein in a case where said stepping motor has stopped at an equilibrium position between any two adjacent detent positions, when said controller controls said stepping motor in motion to stop when said depth of focus of said photographic lens is greater than said predetermined value, said controller controls said stepping motor to stop at either one of said two adjacent detent positions.

11. The auto-focusing device according to claim 10, wherein said controller controls said stepping motor to stop at one of said two adjacent detent positions which renders said photographic lens to have a state of front focus relative to said object.

12. The auto-focusing device according to claim 10, wherein said controller controls said stepping motor to stop at one of said two adjacent detent positions which is closest to the front of a rotational direction of said stepping motor.

13. The auto-focusing device according to claim 4, wherein said photographic lens further comprises another lens group guided along said optical axis to be movable relative to said focusing lens group, said auto-focusing device further comprising another stepping motor for moving said another lens group along said optical axis, and wherein said stepping motor and said another stepping motor are controlled by said controller to move said focusing lens group and said another lens group along said optical axis in opposite directions.

14. An auto-focusing device of a camera, comprising:

a photographic lens having a focusing lens group guided along an optical axis;

a diaphragm;

a stepping motor for moving said focusing lens group along said optical axis to bring an object into focus; and a controller which controls said stepping motor to drive the same by a number of steps, said number of steps being variable, depending on said aperture-value of said diaphragm.

* * * * *